United States Patent [19]

Carson et al.

[11] 4,018,543
[45] Apr. 19, 1977

[54] WHIRLWIND POWER SYSTEM

[75] Inventors: Earl L. Carson, Felton; Donald W. Carson, Ben Lomond, both of Calif.

[73] Assignee: The Raymond Lee Organization, Inc., New York, N.Y.; a part interest

[22] Filed: Sept. 19, 1975

[21] Appl. No.: 614,979

[52] U.S. Cl. .................................... 415/2; 290/55
[51] Int. Cl.[2] .......................................... F03B 3/04
[58] Field of Search .................... 415/2–4, 415/183, 185, DIG. 8; 290/44, 52, 54, 55

[56] References Cited

UNITED STATES PATENTS

| 756,372 | 4/1904 | Johnson | 415/2 |
| 1,503,061 | 7/1924 | Pendergast | 415/4 |
| 1,534,799 | 4/1925 | Maine | 415/2 |
| 1,595,578 | 8/1926 | Sovereign | 415/2 |
| 1,677,745 | 7/1928 | Bonetto | 415/2 |

FOREIGN PATENTS OR APPLICATIONS

| 145,506 | 2/1952 | Australia | 415/4 |
| 23,282 | 5/1917 | Denmark | 415/2 |
| 1,062,631 | 4/1954 | France | 415/4 |
| 539,099 | 3/1922 | France | 415/3 |
| 1,011,132 | 4/1952 | France | 415/4 |
| 28,797 | 12/1924 | France | 415/2 |
| 463,771 | 8/1928 | Germany | 415/4 |

*Primary Examiner* — Henry F. Raduazo
*Attorney, Agent, or Firm* — Daniel Jay Tick

[57] ABSTRACT

A structural housing has a generally toroidal part horizontally positioned and having an upwardly inclining lower base extending upward from a circumference to a first generally circular central area and an upwardly inclining upper base extending upward from a circumference equidistantly vertically spaced from the circumference of the lower base to a second generally circular central area equidistantly vertically spaced from the first central area. The lower and upper bases are coaxial. The housing also has a hollow cylindrical part extending upward from the second central area and coaxial with the lower and upper bases. Partitions in the toroidal part of the housing compress air entering the housing between the circumferences of the lower and upper bases and direct the compressed air in a whirlwind manner to the cylindrical part of the housing and thereby greatly increase the force of the air. A power generator has a rotor device coaxially rotatably mounted in the cylindrical part of the housing and rotated by the air directed via the partitions.

2 Claims, 5 Drawing Figures

WHIRLWIND POWER SYSTEM

BACKGROUND OF THE INVENTION

The present invention relates to a whirlwind power system.

Objects of the invention are to provide a power system which functions to greatly increase the natural force of wind or air and utilize the enhanced force to generate power thereby producing power with fuel, without atmospheric pollution, and without the many problems and difficulties inherent in the use of fuel and the polluting of the atmosphere.

BRIEF DESCRIPTION OF THE DRAWINGS

In order that the invention may be readily carried into effect, it will now be described with reference to the accompanying drawings, wherein.

DETAILED DESCRIPTION OF THE INVENTION

Figure 1:
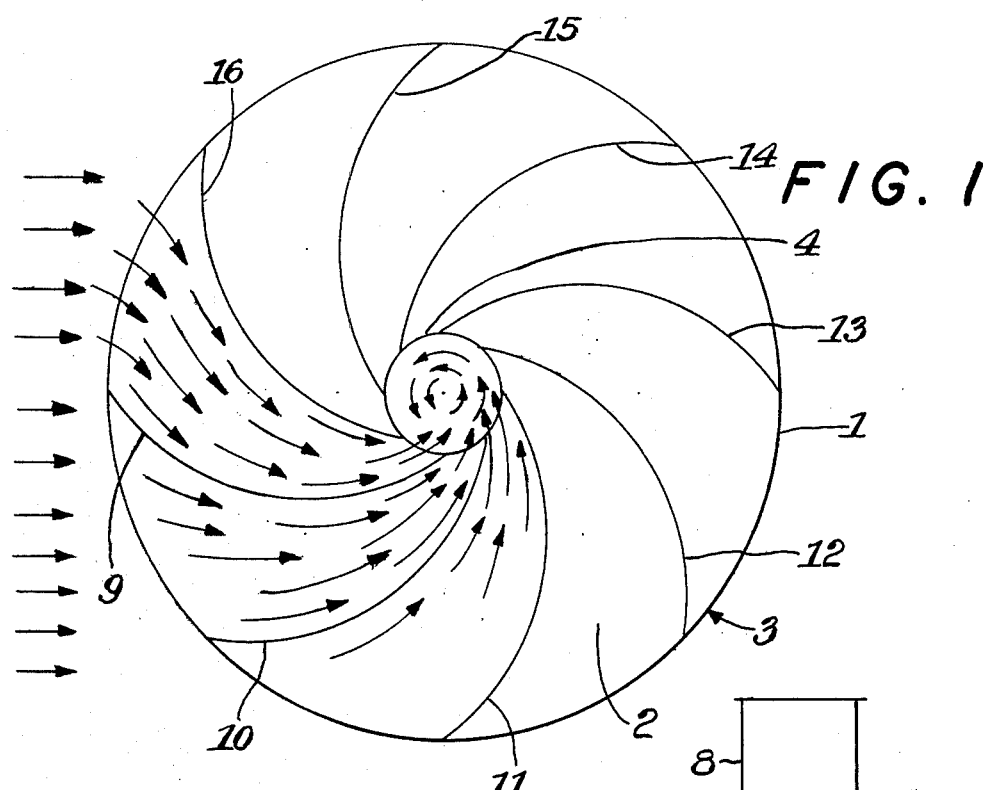
FIG. 1 is an axial view of an embodiment of the toroidal part of the structural housing of the power system of the invention.

The power system of the invention comprises a structural housing having a generally toroidal part 1 substantially horizontally positioned. The toroidal part 1 has an upwardly inclining lower base 2 extending upward from a circumference 3 to a first generally circular central area 4. The toroidal part 1 has an upwardly inclining upper base 5 extending upward from a circumference 6 substantially equidistantly vertically spaced from the circumference 3 of the lower base 2 to a second generally circular central area 7. The second generally circular central area 7 is substantially equidistantly vertically spaced from the first generally circular central area 4. The lower and upper bases 2 and 5 are coaxial, as are the first and second central areas 4 and 7.

A substantially hollow cylindrical part 8 extends upward from the second central area 7 and is substantially coaxial with the lower and upper bases 2 and 5, respectively.

Figure 2:
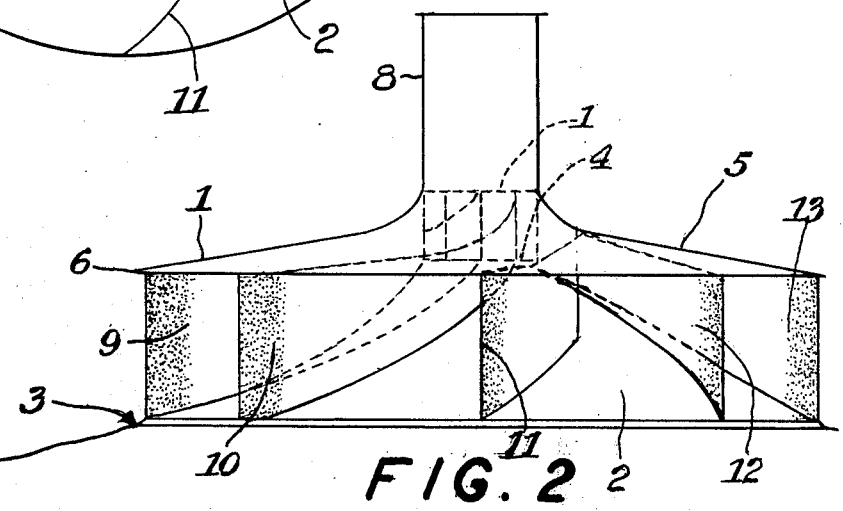
FIG. 2 is a radial view of an embodiment of the structural housing of the power system of the invention.

A plurality of partitions 9, 10, 11, 12, 13 (FIGS. 1 and 2), 14, 15 and 16 (FIG. 1) are provided in the toroidal part 1 of the structural housing of the power system of the invention and function to compress air entering the housing between the circumferences 3 and 6 of the lower and upper bases 2 and 5 and direct the compressed air in a whirlwind manner to the cylindrical part 8 of the housing thereby greatly increasing the force of the air. Each of the partitions 9 to 16, as shown in FIGS. 1 and 2, has the configuration of part of a spiral and extends from the lower base 2 to the upper base 5. The partitions 9 to 16 are equidistantly spaced at the first and second central areas 4 and 7 and are equidistantly spaced at the circumferences 3 and 6 of the lower and upper bases 2 and 5, respectively.

Power generating apparatus of any suitable type, has a rotor device 17 (FIGS. 3 and 5) substantially coaxially rotatably mounted in the cylindrical part 8 of the structural housing of the power system of the invention. The rotor device 17 is rotated by the air directed via the partitions 9 to 16. The rotor device 17 preferably comprises a plurality of turbine blades rotatably supported by a pair of spaced rotor shaft bearing members 18 and 19, coaxially positioned in the cylindrical part 8 of the structural housing and in the first circular central area 4 (FIGS. 3 to 5), respectively.

Figure 3:
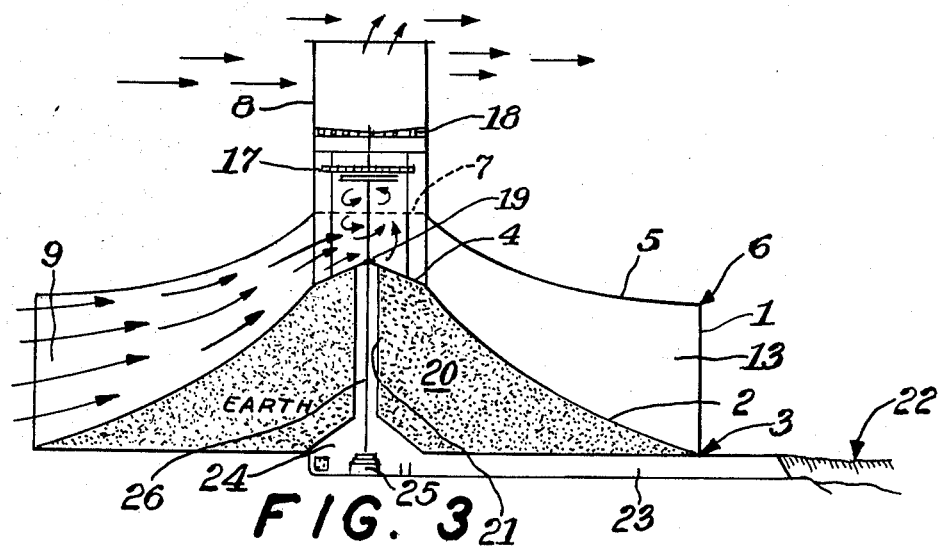
FIG. 3 is a cross-sectional diametrical view of an embodiment of the structural housing of the power system of the invention.
Figure 4:
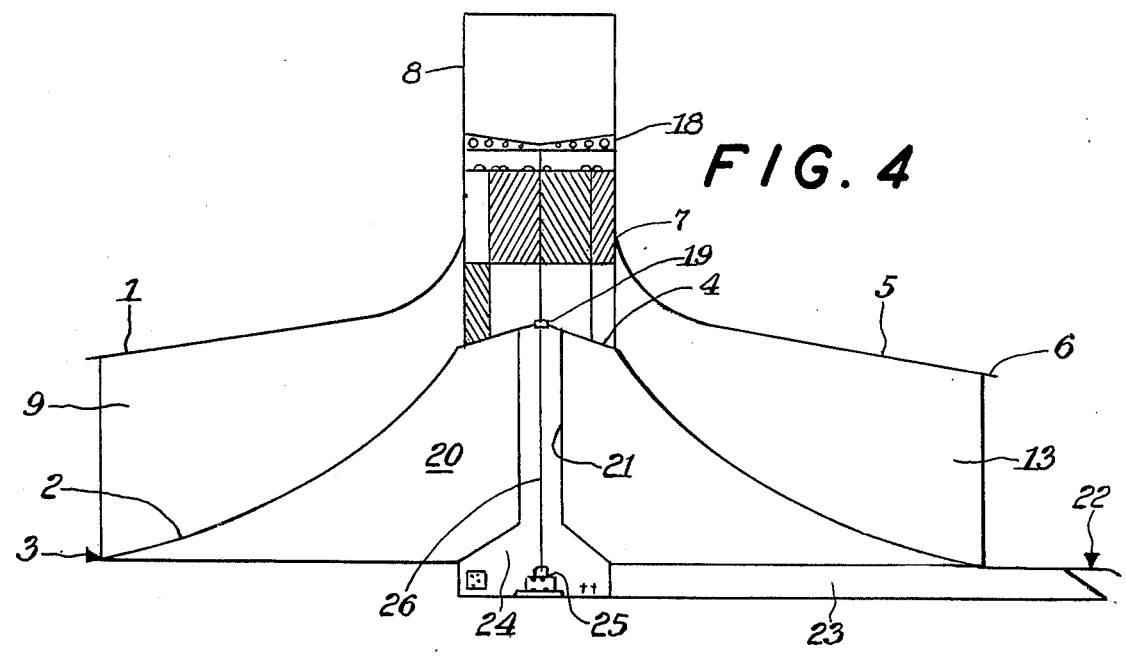
FIG. 4 is a schematic diagram, in a diametrical view, on an enlarged scale, of an embodiment of the structural housing showing the operation of the air control apparatus and the power generator of the power system of the invention.
Figure 5:
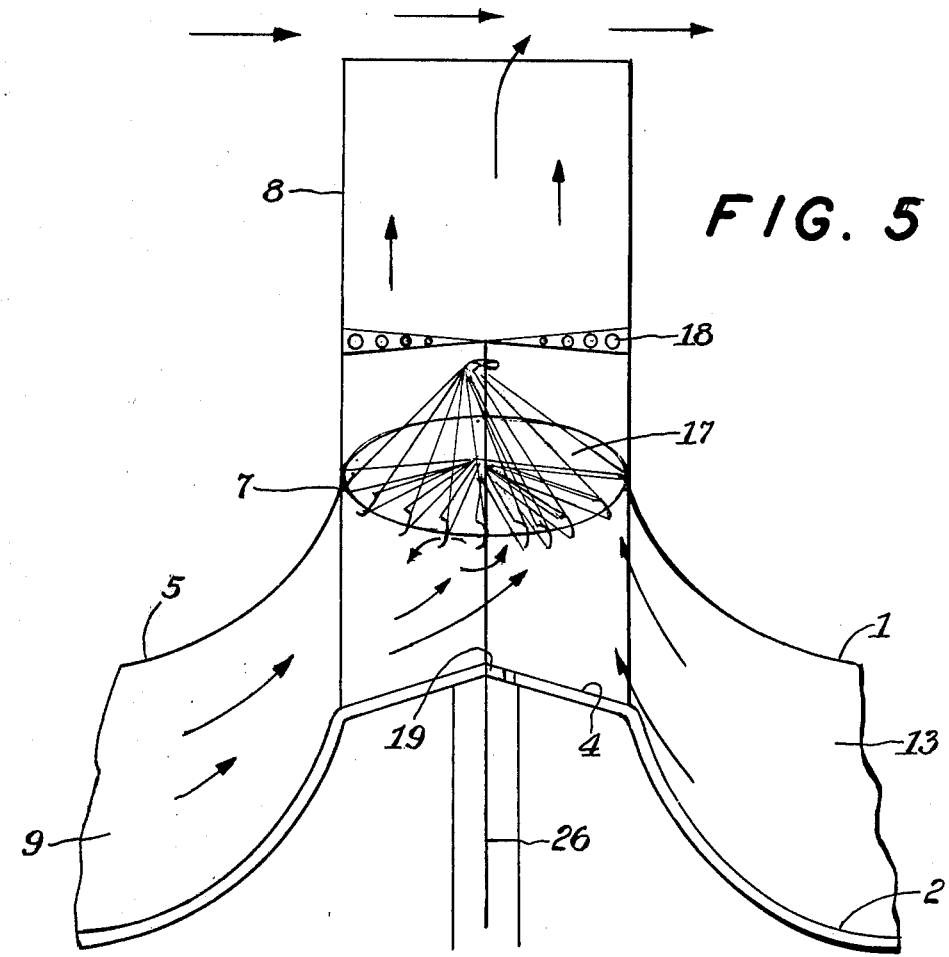
FIG. 5 is a schematic diagram, on an enlarged scale, of an embodiment of the cylindrical part of the structural housing of the power generator of the invention.

As shown in FIGS. 3 and 4 the area 20 under the lower base 2 is generally frustoconical in configuration and preferably comprises an earth fill covered by concrete and having partitions therein. A substantially vertical axial bore 21 is formed through the area 20 from the first central area 4 to a point beneath the surface 22 of the earth, as shown in FIGS. 3 and 4. A tunnel 23 (FIGS. 3 and 4) extends substantially horizontally from a chamber 24 formed in the area 20 at the base of the bore 21 to a point beyond the circumference 3 of the lower base 2, whence access is provided to the surface. Power generating equipment 25 is housed in the chamber 24 and is coupled by shaft 26 to the rotor device 17 (FIGS. 3, 4 and 5).

While the invention has been described by means of a specific example and in a specific embodiment, I do not wish to be limited thereto, for obvious modifications will occur to those skilled in the art without departing from the spirit and scope of the invention.

I claim:

1. A whirlwind power system, comprising
a structural housing having a generally toroidal part substantially horizontally positioned and having an upwardly inclining lower base extending upward from a circumference to a first generally circular central area and an upwardly inclining upper base extending upward from a circumference substantially equidistantly vertically spaced from the circumference of the lower base to a second generally circular central area substantially equidistantly vertically spaced from the first central area, the lower and upper bases being coaxial, and a substantially hollow cylindrical part extending substantially vertically upward from the second central area and substantially coaxial with the lower and upper bases to provide a chimney type flue;
partition means in the toroidal part of the housing for compressing air entering the housing between the circumferences of the lower and upper bases and directing the compressed air in a whirlwind manner to the cylindrical part of the housing and thereby greatly increasing the force of the air, said partition means comprising a plurality of stationary partitions each having the configuration of part of a spiral and extending from the lower base to the upper base, said partitions being equidistantly spaced at the first and second central areas and equidistantly spaced at the circumferences of the lower and upper bases; and
power generating means having rotor means substantially coaxially rotatably mounted in the cylindrical part of the housing and rotated by the air directed via the partition means, said power generating means including a plurality of turbine blades coaxially rotatably supported in the cylindrical part, a chamber formed in the earth under the structural housing, power generating means in the chamber and coupling means coupling the turbine blades to the power generating means for operating said power generating means.

2. A whirlwind power system as claimed in claim 1, wherein said power generating means further includes bearing means substantially coaxially mounted in the cylindrical part and a rotor shaft rotatably mounted in the bearing means substantially coaxially in said cylindrical part, said turbine blades comprising a plurality of equiangularly spaced turbine blades affixed to said rotor shaft and extending radially therefrom and rotatable therewith.

* * * * *